UNITED STATES PATENT OFFICE.

MAURICE VERGNES, OF NEW YORK, N. Y.

IMPROVEMENT IN LIQUIDS FOR EXCITING GALVANIC BATTERIES.

Specification forming part of Letters Patent No. 34,656, dated March 11, 1862.

*To all whom it may concern:*

Be it known that I, MAURICE VERGNES, of the city and State of New York, have invented a new and useful fluid for use in galvanic or voltaic batteries in the place of nitric acid; and I do hereby declare that the following is a full, clear, and exact description thereof, and of its construction and mode or manner of operation.

The nature of my invention consists in preparing or compounding a fluid which may be used in the place of nitric acid in galvanic batteries using nitric acid, which is more effective for the purposes required than nitric acid, which lasts or continues effective for a much longer time without replenishing, which is free from offensive smell or odor, and which is healthy, rather than injurious, to those exposed to it.

This fluid is prepared substantially as follows: To fifteen parts of water I add one part of bichromate of potash, and then boil the mixture gently for about an hour and a half in an iron vessel glazed in the inside or covered with porcelain, glass, or like substance. It is then set aside in a warm place to cool gradually and allow the complete precipitation of all the salt which will not be held in solution by the water. When cold and all the precipitation has taken place which will take place, the clear liquid is poured off. I then take one ounce of finely-powdered chlorate of potash and put it with a little warm water, enough to make a thinnish paste. This I put in a bottle and add slowly one pound of the liquid above mentioned of the bichromate of potash. The whole is shaken and warmed a little until the chlorate is perfectly dissolved. These proportions may be varied somewhat, according to the purity of the salts, &c.; but generally one pound of the liquid bichromate of potash will take up just about an ounce of the chlorate. When it has settled, if there is any precipitation, the clear liquid is poured off. This liquid I designate, for distinction, "fluid No. 1." I then prepare another fluid by saturating sulphuric acid with peroxide of manganese, shaking the mixture frequently, which should be kept in a dark, cool place. After having been mixed and shaken for a couple of days the manganese is permitted to settle gradually, when a violet-colored liquid will be obtained. This is "fluid No. 2." I then take one pound of the liquid of the two salts of potash—liquid No. 1—and mix with it four ounces of liquid No. 2. The operation of mixing these two must be conducted very slowly, adding the fluid No. 2 little by little, and shaking the bottle a little to insure complete mixture. If mixed suddenly and violently, there will be produced or developed considerable heat, which would affect the valuable properties of the mixture. The fluid thus produced is free from smell, and is healthy in its nature, as the acid developed by it, which is only in small quantities, is chloric acid. The use of this fluid in the place of nitric acid in a battery renders the battery more effective, and it will not require refilling or replenishing for a considerable length of time—say fifteen to twenty or more days—whereas when nitric acid is used the battery must be replenished daily. The zinc used continues bright and unspotted, so that a more vigorous action and a more uniform current is obtained. The proportions above given may, however, be varied some little without materially affecting the character of the separate or united fluids.

I do not claim the use of bichromate of potash in galvanic batteries; nor do I claim the use of peroxide of manganese in connection with sulphuric acid.

What I claim as my invention or discovery, and desire to secure by Letters Patent, is—

The preparation and production of a fluid for use in galvanic batteries in the place of nitric acid, composed or prepared with a solution of the two salts bichromate and chlorate of potash, in connection with peroxide of manganese treated with sulphuric acid, as described, the whole prepared substantially as set forth.

M. VERGNES.

Witnesses:
  S. D. LAW,
  HOWARD BIRD.